United States Patent
Dorrington et al.

(10) Patent No.: US 9,182,491 B2
(45) Date of Patent: Nov. 10, 2015

(54) SELECTIVE DISTANCE RANGE IMAGING

(75) Inventors: Adrian Andrew Dorrington, Hamilton (NZ); Andrew Dean Payne, Hamilton (NZ)

(73) Assignee: WaikatoLink Limited, Hamilton (NZ)

( * ) Notice: Subject to any disclaimer, the term of this patent is extended or adjusted under 35 U.S.C. 154(b) by 295 days.

(21) Appl. No.: 13/463,743

(22) Filed: May 3, 2012

(65) Prior Publication Data

US 2012/0307230 A1 Dec. 6, 2012

Related U.S. Application Data

(60) Provisional application No. 61/483,174, filed on May 6, 2011.

(51) Int. Cl.
*G01S 17/36* (2006.01)
*G01S 17/89* (2006.01)
*G01S 17/10* (2006.01)

(52) U.S. Cl.
CPC .............. *G01S 17/36* (2013.01); *G01S 17/89* (2013.01); *G01S 17/107* (2013.01)

(58) Field of Classification Search
CPC ....... G01S 17/36; G01S 17/89; G01S 17/107; G01C 3/08
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,075,863 A | 12/1991 | Nagamune et al. | |
| 5,534,993 A | 7/1996 | Ball et al. | |
| 5,835,199 A | 11/1998 | Phillips et al. | |
| 6,031,601 A * | 2/2000 | McCusker et al. | 356/5.01 |
| 6,714,286 B1 * | 3/2004 | Wheel | 356/5.05 |
| 7,391,505 B2 | 6/2008 | Dorrington | |
| 7,541,255 B2 | 6/2009 | Kim et al. | |
| 2002/0048012 A1* | 4/2002 | Stann | 356/5.09 |
| 2002/0176067 A1 | 11/2002 | Charbon | |
| 2004/0227661 A1 | 11/2004 | Godsy | |
| 2007/0215795 A1* | 9/2007 | Kameyama et al. | 250/222.2 |

FOREIGN PATENT DOCUMENTS

| | | |
|---|---|---|
| EP | 1612511 A1 | 1/2006 |
| EP | 1752793 A1 | 2/2007 |

(Continued)

OTHER PUBLICATIONS

Office Action received for Chinese Patent Application No. 2012800220655, mailed on Dec. 16, 2014, 23 pages (12 pages of English Translation and 11 pages of official copy).

(Continued)

*Primary Examiner* — Luke Ratcliffe
(74) *Attorney, Agent, or Firm* — Morrison & Foerster LLP

(57) ABSTRACT

A method for determining a distance to an object using an amplitude modulated continuous wave range imaging device includes emitting a modulated illumination signal. The modulated illumination signal is modulated with a pseudo random code. An image sensor is modulated based on the pseudo random code to capture a plurality of samples of the modulated illumination signal reflected from the object. A phase shift between the plurality of samples and the modulated illumination signal is determined.

25 Claims, 20 Drawing Sheets
(11 of 20 Drawing Sheet(s) Filed in Color)

(56) References Cited

FOREIGN PATENT DOCUMENTS

| | | |
|---|---|---|
| EP | 2017651 A2 | 1/2009 |
| JP | 2000-338243 A | 12/2000 |
| WO | 2004/090568 A1 | 10/2004 |
| WO | 2006/031130 A1 | 3/2006 |
| WO | 2009/051499 A1 | 4/2009 |

OTHER PUBLICATIONS

Extended European Search Report (includes Supplementary European Search Report and Search Opinion) received for European Patent Application No. 12781677.5, mailed on Oct. 9, 2014, 9 pages.

* cited by examiner

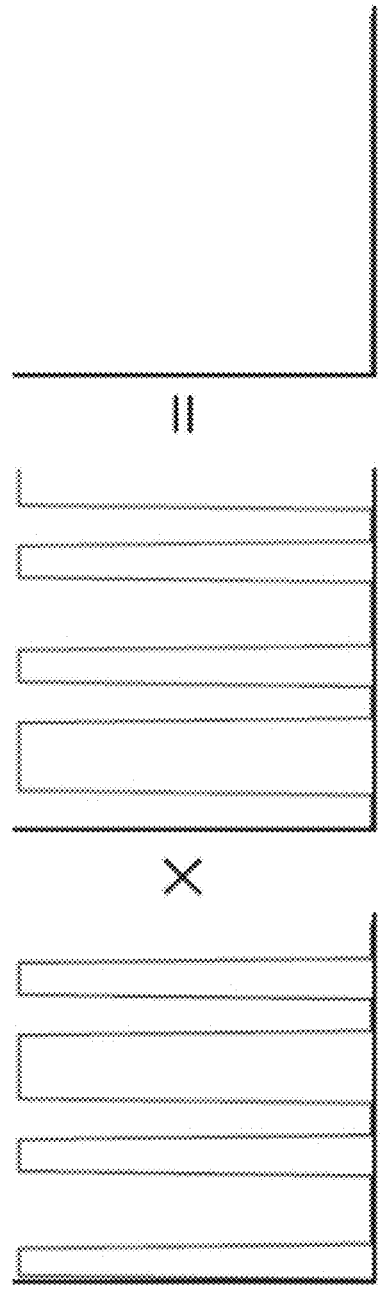

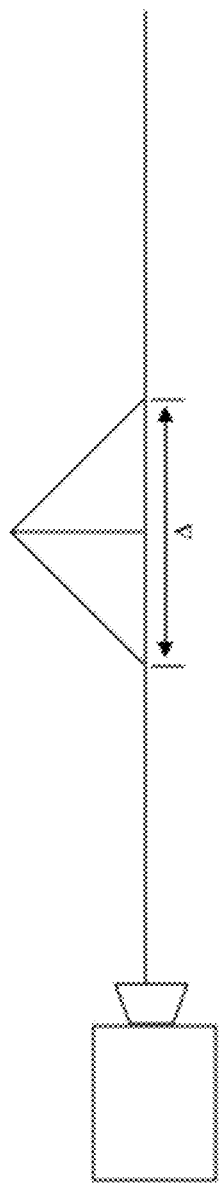

SELECTIVE DISTANCE RANGE IMAGING

CROSS-REFERENCE TO RELATED APPLICATIONS

This application claims the benefit under 35 USC 119(e) of U.S. Provisional Patent Application No. 61/483,174, filed May 6, 2011, which is incorporated herein by reference in its entirety for all purposes.

FIELD OF INVENTION

This disclosure relates generally to intensity and depth/range detection and, more particularly, to a method and apparatus for selective range imaging.

BACKGROUND OF INVENTION

Range imaging systems, also referred to as range cameras, range imaging cameras or ranging devices, determine both distance and intensity for objects in a scene to be imaged. One common type of range imaging camera utilizes Amplitude Modulated Continuous Wave ("AMCW") technology.

As discussed in more detail below, a range imaging camera utilizing AMCW technology typically uses a light source to emit an intensity modulated illumination signal to illuminate a scene to be imaged. The signal is then reflected back to the range imaging camera by objects within the scene. Multiple images of the reflected light are then captured by a specialized sensor chip, such as a CMOS image sensor. A processor is then used to compare these multiple images to each other and to the emitted intensity modulated illumination signal to determine phase changes in the intensity modulation of the light. These phase changes are then analyzed to determine the distance between the objects and the range imaging camera, as well as to determine the size, shape and location of the objects in the scene. Range imaging cameras are therefore very useful in many varied applications such as automotive safety and control systems, multimedia user interfaces, and image segmentation and surface profiling.

Effective determination of the range between a range imaging camera and an object to be imaged depends on the phase difference between the intensity modulated illumination signal and the received signal. Because the image sensor is generally modulated with the illumination signal, as light travels away from a range imaging camera, that light begins to slip out of phase with the modulation of the image sensor. Consequently, the shorter the distance traveled by the light, the more in-phase the light will be. In other words, light reflected from objects close to the range imaging camera have an intensity modulation that is close to in phase with the modulation of the range imaging camera, while light reflected from distant objects has an intensity modulation that is out of phase with the range imaging camera. While the same signal is commonly used to modulate both the illumination signal and the image sensor, different signals may be used in some situations to achieve similar results.

As with a digital photograph, the captured images will typically be formed by an array of pixels, with objects in the scene being effectively mapped onto the pixel array. Unlike a typical digital image, the pixels captured by a range imaging camera will record not only the illumination intensity (which may include the color) of the light reflected from an object in a scene, but also a phase of the modulation envelope. Accordingly, each of the pixels in a captured image will have a phase component that is based on the light reflected back to that pixel by objects in the scene. Furthermore, pixels that correspond to areas of the scene that do not have objects in them will not receive a reflected signal, but will only receive ambient light or light reflected from another source (such as the sun) or multi-path modulated light (emitted light reflecting off other objects in the scene creating an undesired interfering signal). Typical range imaging camera sensors include background or DC rejection circuitry that allows more efficient use of the sensor's dynamic range for capturing the modulated light, therefore, background light is effectively ignored by the sensor.

While there are many ways to implement typical range imaging cameras, FIG. 1 has been provided to show a simplified version of one such range imaging camera. As shown in FIG. 1, a typical AMCW range imaging camera 100 may include a signalling device 101 to emit an intensity modulated illumination signal, e.g., a laser diode or a light emitting diode, towards a scene to be imaged and an image sensor 102 to capture images using the portions of the emitted signal that are reflected back to the system 100 from the objects within the scene. A processor 103 then compares the emitted signal with captured images to determine the intensity and the phase shift for each pixel in the captured image. By doing so, the processor is able to determine the distance objects in the scene are from the system 100. The system 100 may optionally contain an input device 104 to control the system 100, a display 105, and a memory 106; or these devices 104, 105, and 106, may be in the form of a separate computer system connected by an interface cable. These devices may be chosen from among any of the known devices for performing such functions. There are many known ways of modulating the signalling device 101 and the image sensor 102. For example, the signalling device may simply be a light source that is cycled on and off very quickly, while the image sensor 102 may be modulated using a high speed shutter or by controlling the gain or sensitivity of image sensor. The processor 103 may also include a signal generator, or a similar device, to assist in modulating the signalling device 101 and the image sensor 102. However, a signal generator may also be separately provided.

FIG. 2 depicts a simplified functional diagram of the standard range imaging camera described above with reference to FIG. 1. As shown in FIG. 2, the intensity modulation envelope of the illumination signal emitted from the signaling device 101 is shown as a sinusoidal wave shape, but is also typically modulated as a square wave. The signal is then reflected from various objects 21, 22, and 23 within the scene being imaged. As shown in FIG. 2, the light reflected back to the image sensor 102 will travel different distances based on the relative distances of the objects 21, 22, and 23 reflecting the light. This will result in the received light's modulation having different phases based on the distance traveled. Although not shown in FIG. 2, the amplitude of the waveform will also change based on the distance traveled and surface scattering properties of the objects.

FIG. 11 shows a schematic view of components employed to provide a known range sensing system. While this schematic diagram shows a shutter being used to modulate the image sensor, it is noted that various sensors may be used which do not require the use of a shutter for this purpose.

Methods for analyzing signal measurements are disclosed in, for example, U.S. Pat. No. 7,541,255 to Billmers et al., U.S. Pat. No. 7,391,505 to Dorrington, U.S. Pat. No. 5,835,199 to Phillips et al., and U.S. Pat. No. 5,534,993 to Ball et al., all of which are herein incorporated by reference in their entirety. Also, see International Publication No. 2004/090568 to Dorrington, International Publication No. 2006/031130 to Carnegie et al., and International Publication No. 2009/051499 to Payne et al., all of which are herein incorporated by reference in their entirety.

Conventional range imaging cameras, however, do not perform well in certain conditions. For example, when the air between a conventional range imaging camera and an object to be imaged is not clear, such as when fog or smoke is present, or where imaging is performed through glass or plastic windows, the conventional range imaging camera may not be able to accurately determine the distance to the object. In particular, particles or debris suspended in the air may result in the illumination signal from the conventional range imaging camera being partially reflected back, which may then result in an inaccurate distance determination.

SUMMARY

Embodiments of the invention may relate to a method and apparatus for imaging objects at a selectable distance from an amplitude modulated continuous wave range imaging device. The method includes emitting a modulated illumination signal that is intensity modulated with a pseudo random code (or a continuous wave combined with a pseudo random code) receiving a reflection of the modulated illumination signal at an image sensor; capturing a plurality of samples of the reflected modulated illumination signal, wherein the sampling is modulated using the pseudo random code; determining a phase shift or time delay between the emitted modulated illumination signal and the plurality of samples to determine at least one phase shift or time delay; and determining a range between the device and at least one object based on the determined phase shift or time delay.

The region or window in which the selected objects are detected is determined by the rate and relative timing of the illumination and sampling pseudo random code. Using this method it is possible to ensure that only objects within the imaging window are imaged by the ranging device. The method may also include compensating for signal offset and noise, and multi-path interference.

Additional aspects of the method may include delaying the sampling modulation code to determine an imaging window such that a distance between the device and the imaging window is determined based on the delay. Using this method, the location of the imaging window in the scene can be adjusted in real time.

According to further aspects of the invention a further method of imaging objects at a selectable distance from an amplitude modulated continuous wave range imaging device may include: emitting a modulated illumination signal that is intensity modulated with a pseudo random code; receiving a reflection of the modulated illumination signal at an image sensor; capturing a plurality of samples of the reflected modulated illumination signal, wherein the sampling is modulated using the pseudo random code; and adjusting an operating frequency of the pseudo random code to determine an imaging window, wherein only objects within the imaging window are imaged by the ranging device. A distance between a front edge and a rear edge of the imaging window may be determined based on the operating frequency of the pseudo random code.

An amplitude modulated continuous wave range imaging device according to the invention may include: an illumination device configured to emit a modulated illumination signal, wherein the modulated illumination signal is intensity modulated with a pseudo random code; an image sensor to receive a reflection of the modulated illumination signal, the image sensor configured to capture a plurality of samples of the reflected modulated illumination signal, wherein the sampling is modulated using the pseudo random code; and a processor to determine a phase shift between the emitted modulated illumination signal and the plurality of samples to determine at least one phase shift, and to delay the modulation of the sampling with respect to the modulation of modulated illumination signal.

Additionally, the processor may be configured to determine a range between the device and at least one object based on the determined phase shift. Also, the illumination device may be configured to continuously emit the intensity modulated modulated illumination signal when the image sensor is sampling. The processor may also be configured to adjust a clock cycle of the modulated illumination signal. Furthermore, a length of the delay of the modulation of the sampling with respect to the modulation of the modulated illumination signal may be adjusted in substantially real time.

The amplitude modulated continuous wave range imaging device may incorporate a length of the delay of the modulation of the sampling with respect to the modulation of modulated illumination signal that can be adjusted in substantially real time based upon movement of an object being imaged. The device may be configured to only image objects within an imaging window, where the imaging window has a front edge and a rear edge, and a substantially triangular shape. The device may also include a frequency adjustor to adjust an operating frequency of the pseudo random code. Additionally, an imaging window may be determined based on the operating frequency of the pseudo random code.

Another exemplary method for determining a distance to an object using an amplitude modulated continuous wave range imaging device includes emitting a modulated illumination signal. The modulated illumination signal is modulated with a pseudo random code. An image sensor is modulated based on the pseudo random code to capture a plurality of samples of the modulated illumination signal reflected from the object. A phase shift between the plurality of samples and the modulated illumination signal is determined.

DETAILED DESCRIPTION OF THE DRAWINGS

The patent or application file contains at least one drawing executed in color. Copies of this patent or patent application publication with color drawing(s) will be provided by the Office upon request and payment of the necessary fee.

FIG. 6c depicts a mixing of signals modulated using asynchronous pseudo random codes.

FIG. 8a depicts a triangular nature of an imaging window created according to an exemplary embodiment of the invention.

DETAILED DESCRIPTION OF THE INVENTION

In the following description of exemplary embodiments of the invention, reference is made to the accompanying drawings in which embodiments of the invention are shown by way of illustration. It is to be understood that other embodiments can be used and structural changes can be made without departing from the spirit and scope of the invention.

Figure 9:
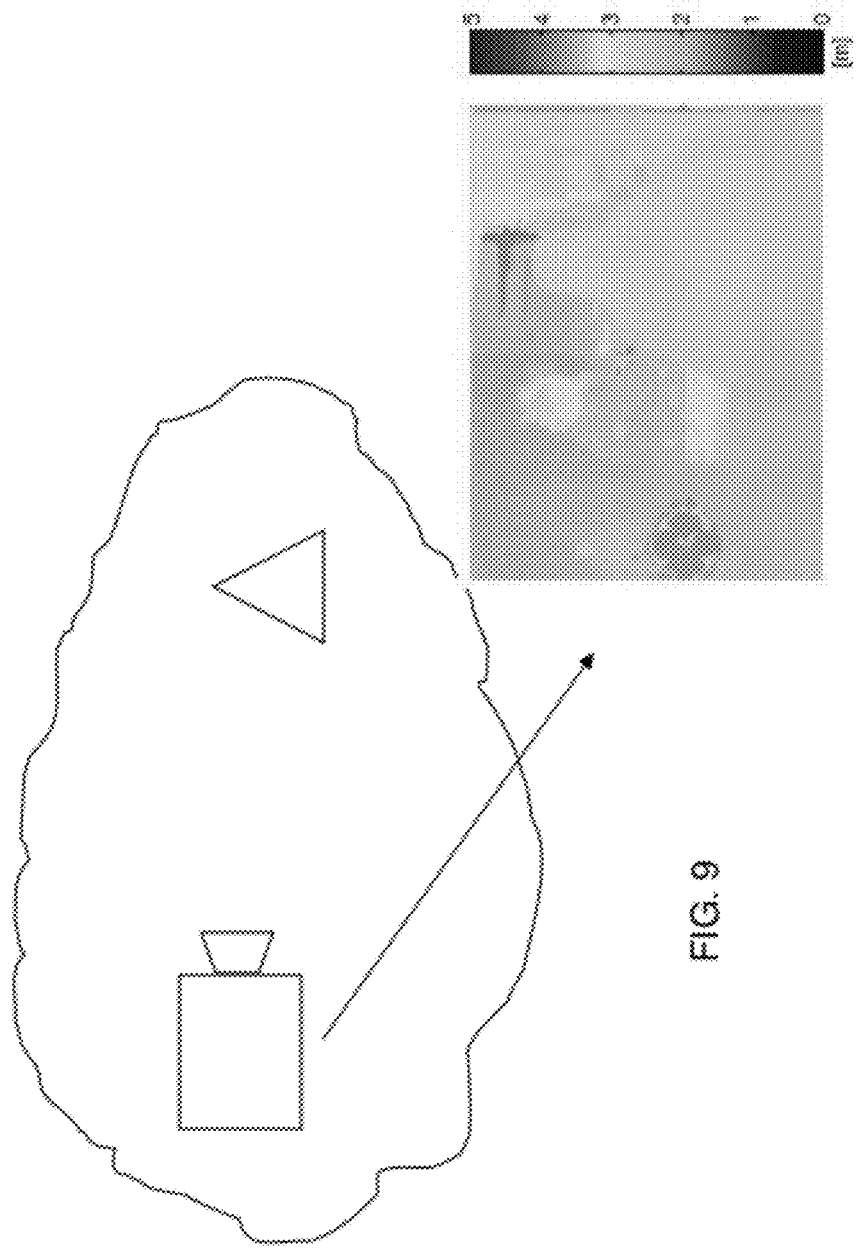
FIG. 9 depicts the results of imaging an exemplary scene through a dirty window using a known imaging device.
Figure 10:
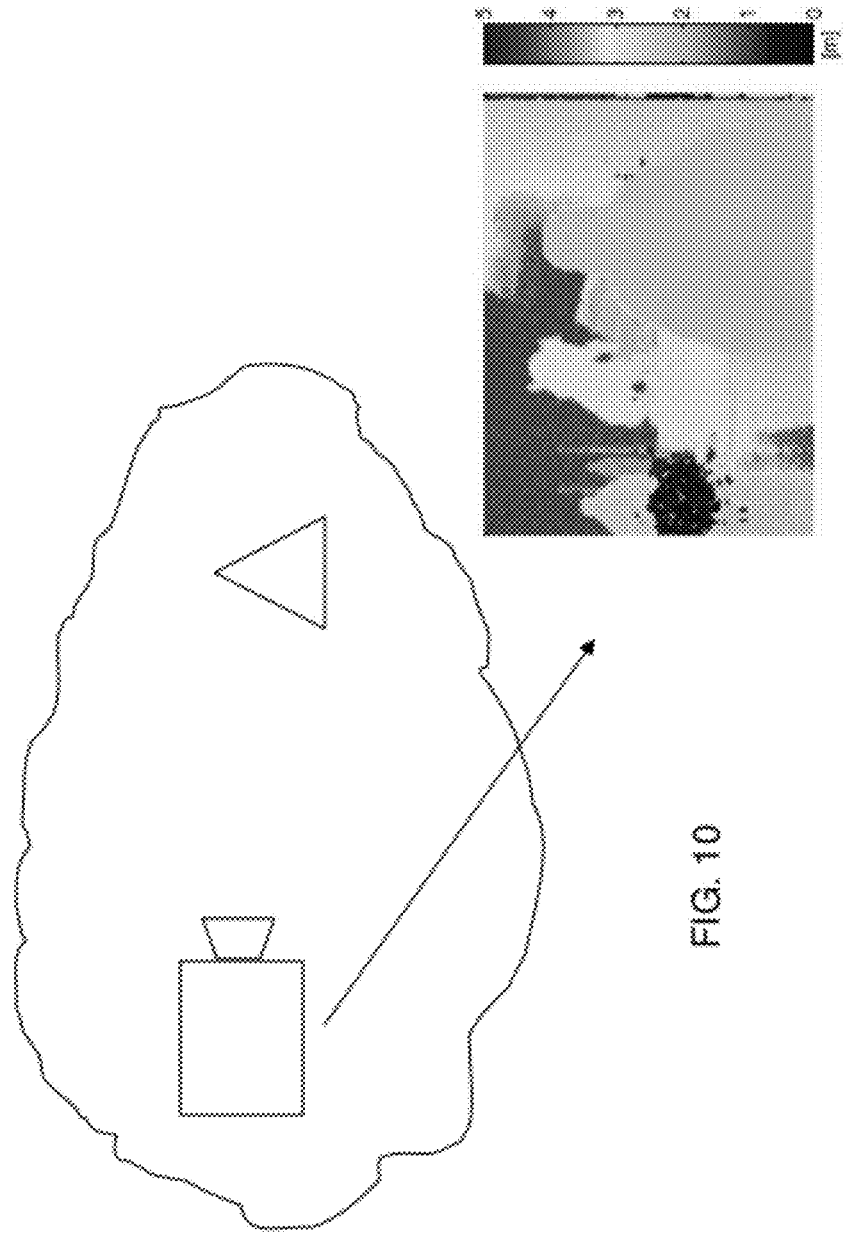
FIG. 10 depicts the results of imaging the exemplary scene of FIG. 9, through a dirty window using an imaging device incorporating an exemplary embodiment of the invention.
Figure 11:
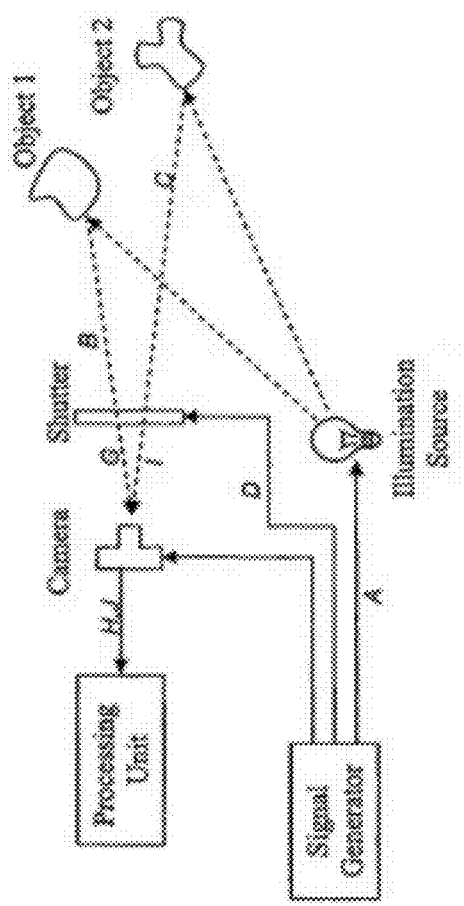
FIG. 11 shows a schematic view of components employed to provide a known range sensing system.

As mentioned above, conventional range imaging cameras do not perform well in certain operating conditions. For example, when the air between a range imaging camera and an object to be imaged is not clear, the range imaging camera may not be able to accurately determine the distance. This inaccuracy is the result of the illumination signal being partially reflected back to the range imaging camera from particles, debris, or glass or plastic windows suspended in the air. As discussed above, the image sensor of a range imaging camera captures multiple images of a scene. These images will be represented by pixels that have both illumination and phase components. Under normal conditions, the signal reflected back to the range imaging camera and focused on a single pixel has only a single phase component. This is because all of the modulated signal that is incident on the pixel has been reflected from a single object. While some additional ambient light may be incident on the pixel, that light is not modulated and may be accounted for by the processor. However, when there are particles suspended in the air between the range imaging camera and the object, as may be the case when fog, smoke, or a dusty window is present, some of the modulated illumination signal is reflected back to the range imaging camera before it reaches the object being imaged. This results in a pixel capturing modulated illumination signal having different phase components. It is not possible for the existing range imaging cameras to determine which phase component relates to the object and which relates to the airborne particles. Additionally, the modulated illumination signal may be scattered by the air particles and thereby cause multiple pixels to be effected by the reflected signals. FIG. 9 shows an example of an image affected by a "dirty" window placed in the path of the illumination signal. As shown in FIG. 9, a standard range imaging camera is unable to correctly determine the distance to various portions of an imaged object due to unwanted reflections and light scattering.

Similarly, there are certain emerging applications for which the known AMCW range imaging cameras are not particularly well suited. New computer control systems are being developed which rely on range imaging cameras to determine when a user makes certain motions (for example hand gestures) that are intended to control the computer system. Many of these new applications are currently being used for gaming consoles and for controlling personal computers. Current range imaging cameras may be used with these systems when the users are isolated, for example, when they are alone in front of a solid background, such as a wall. However, when the users are in a location where there is activity occurring behind the user, the current range imaging cameras can have difficulty determining if a gesture is made by a user or by a person in the background. The current range imaging cameras have this difficulty because the image sensor of a typical range imaging camera collects light reflected from objects at all distances, in front of the range imaging camera. Therefore, an object, or a person, will be "seen" by the range imaging camera regardless of its distance from the range imaging camera, as long as no other objects are located between the object and the range imaging camera. While it is sometimes possible to correct for background motions, it is often difficult due to the proximity of other people, for example in a gaming environment.

These systems may also be confused by the movement of objects located farther away from the range imaging camera where the reflected intensity modulated illumination signal is more than 360° out of phase. When this occurs, the range imaging camera may interpret very distant objects to be much closer to the range imaging camera. These same difficulties are present in other emerging systems, such as vehicle safety systems. New vehicle safety systems are starting to use range imaging cameras to determine the proximity of moving vehicles. The determined proximity is then used to control functions such as cruise control or emergency braking.

The difficulties associated with a partially opaque medium are not unique to range imaging cameras. Similar conditions are known in the field of underwater photography. Capturing images underwater can be difficult because water is often murky or clouded. Cloudy water, similar to fog, can cause light scattering sufficient to prohibit image capture. One solution used in underwater photography is known as "range-gated imaging." Range-gated imaging works by using a high-speed flash to illuminate a scene. A carefully timed delay is then added between the flash and the triggering of the range imaging camera's shutter. Due to this delay, light reflected from the murky water close to the range-gated imaging camera is not imaged because it returns to the range imaging camera before the shutter is triggered. Advantageously, light reflected from objects located at least a predetermined distance away from the range-gated imaging camera is, however, captured because the shutter is timed to be open when such light returns to the range imaging camera. Similarly, light reflected from objects beyond a certain distance is not captured because the range imaging camera's shutter closes before that light returns to the range-gated imaging camera. The distance over which objects will be imaged can be adjusted by adjusting the time delay, as well as the shutter and flash speeds. While some form of range-gated approach may be effective in overcoming this issue, the temporal domain approach used in underwater photography is not ideally compatible with AMCW based range imaging because AMCW based range imaging utilizes a prolonged illumination of a scene and prolonged image integration times, thereby collecting much more light, to produce images with the significantly improved signal to noise ratio; thereby achieving better measurement precision than is possible with a pulse gated approach.

In an exemplary embodiment of the invention, pseudo random coding is utilized to overcome the deficiencies of conventional range imaging cameras. As will be described in more detail below, both an emitted illumination signal and an image sensor are modulated using a pseudo random code to compensate for both a partially opaque medium, such as foggy air, and for background and foreground objects or people. Also, the use of pseudo random codes allows for imaging windows to be defined such that the range imaging cameras only recognize objects within the range imaging windows as objects to be imaged. The sensor is tuned to recognize a particular illumination coding pattern and timing. Signals reflected by objects outside of the imaging windows do not match the tuned pattern and instead are averaged by the image integration process and recognized as constant background illumination that may be compensated for using any of the known techniques. As further discussed below, it is possible to dynamically adjust the location and size of the imaging windows according to the requirements of the systems.

In the present exemplary embodiment, an illumination signal is modulated using a pseudo random code prior to emission, and the image sensor is modulated using the same pseudo random code. When the signal is reflected back to the range imaging camera from a distant object, the processor is able to isolate signals that are reflections of the modulated illumination signal based on constructive interference.

Figure 5A:
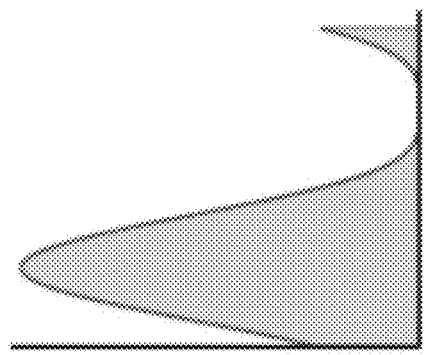
FIG. 5a depicts the mixing of two synchronous signals.
Figure 5A:
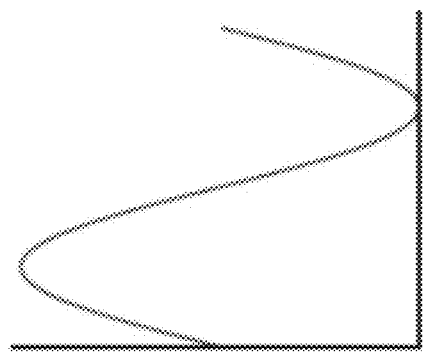
Figure 5A:
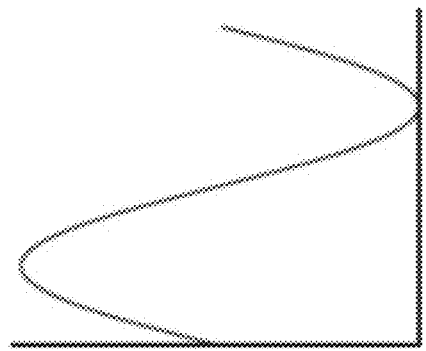
Figure 5B:
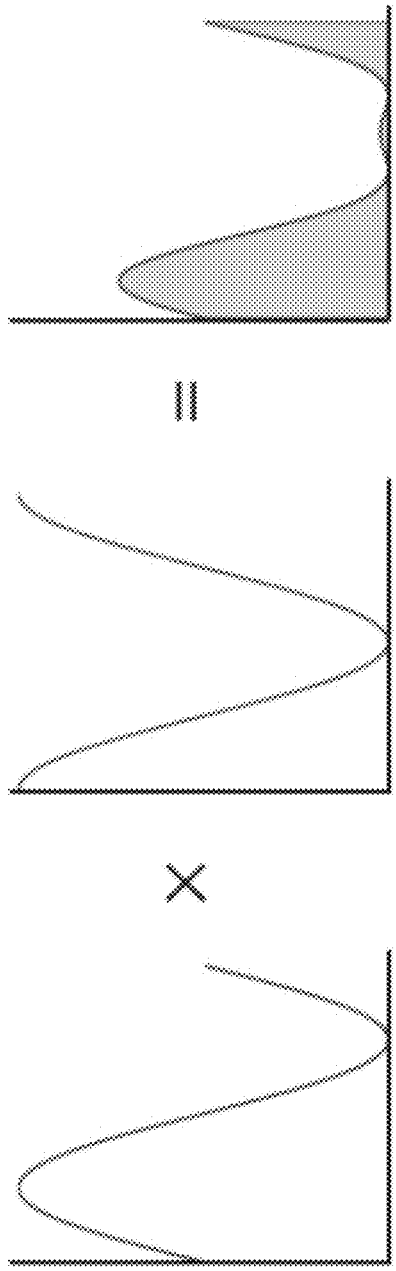
FIG. 5b depicts the mixing of two signals that are 90° out of synchronization.
Figure 5C:
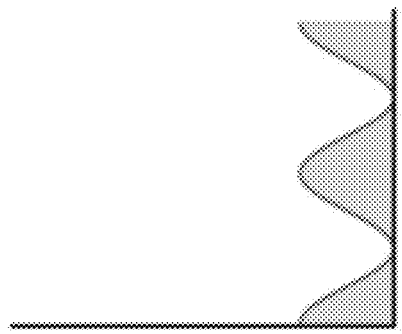
FIG. 5c depicts the mixing of two signals that are 180° out of synchronization.
Figure 5C:
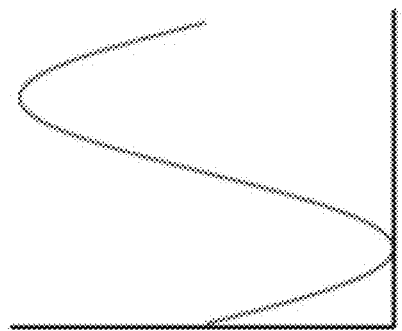
Figure 5C:
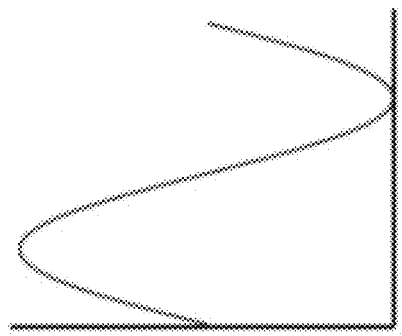
Figure 5D:
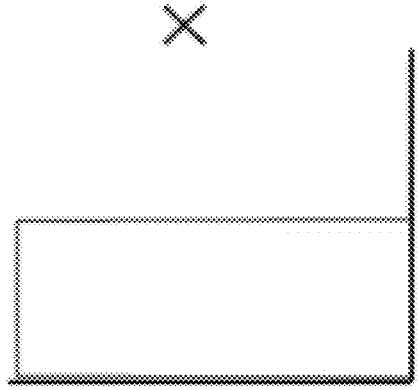
FIG. 5d depicts the mixing of two synchronous square waves.
Figure 5D:
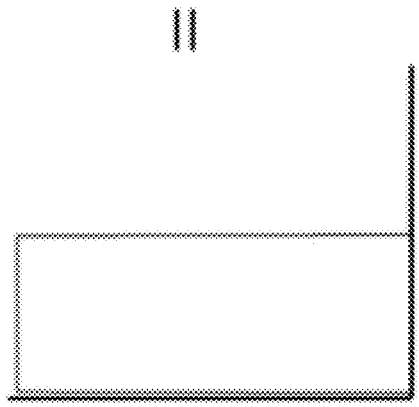
Figure 5D:
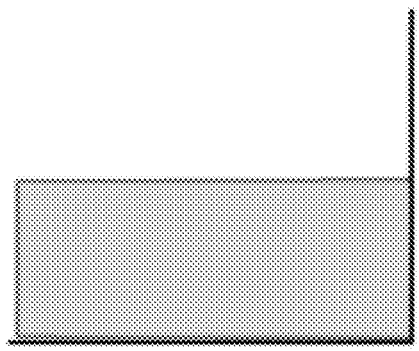
Figure 5E:
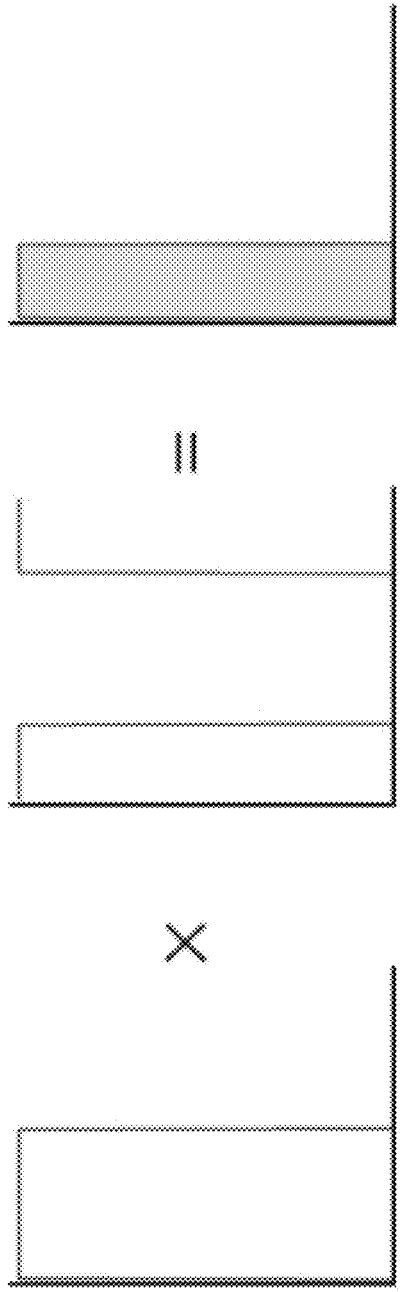
FIG. 5e depicts the mixing of two square waves that are 90° out of synchronization.
Figure 5F:
FIG. 5f depicts the mixing of two square waves that are 180° out of synchronization.
Figure 5F:
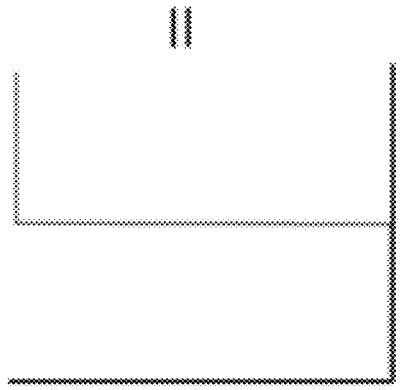
Figure 5F:
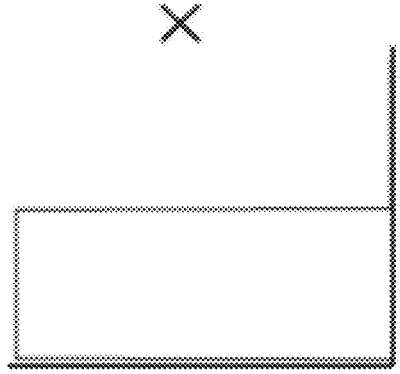
Figure 6A:
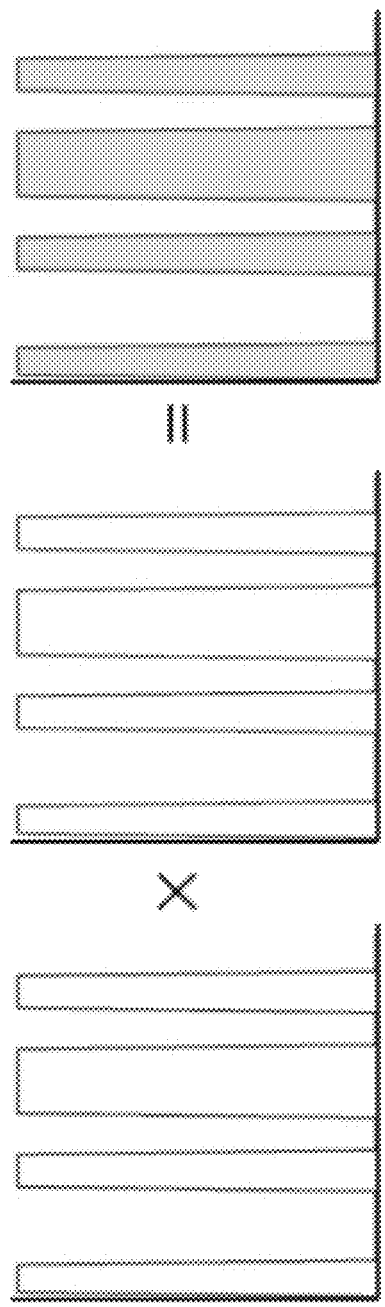
FIG. 6a depicts a mixing of signals modulated using synchronized pseudo random codes.

By way of a simplified explanation, it is helpful to imagine a case where two sine waves having the same frequency and amplitude are mixed together as shown in FIG. 5a. When the waves are in synchronization, a type of constructive interference occurs and the mixing results in a larger amplitude waveform, averaging to a substantial value after integration, as indicated by the shaded area under the resultant mixed signal. In contrast, when the waves are 90° out of synchronization, the mixing of the signals results in a waveform in which portions of the signal have a reduced integrated value, as shown in FIG. 5b. Additionally, when the waves are 180° out of synchronization, the mixing of the signals results in a low amplitude signal, as shown in FIG. 5c. FIGS. 5d, 5e, and 5f depict the mixing of square waves that are 0°, 90°, and 180° out of synchronization, respectively. When this same principle is applied to signals that have been modulated using synchronized pseudo random codes, similar results occur, as shown in FIG. 6a. That is, when a transmitted signal is mixed with an identically modulated demodulation signal, and the signals are synchronized, there is constructive interference that results in a maximum correlation value and a maximum integrated signal value.

Figure 6B:
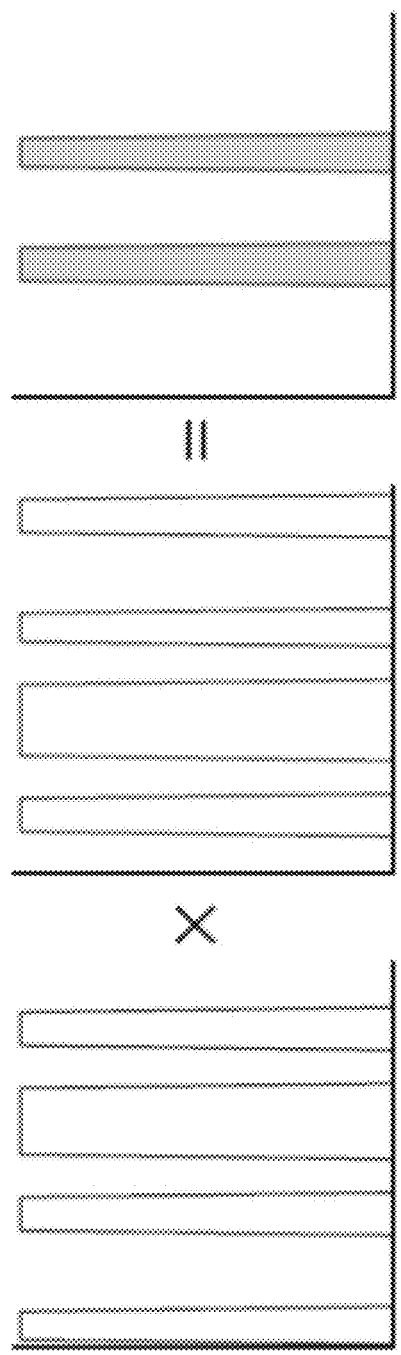
FIG. 6b depicts a mixing of signals modulated using partially asynchronous pseudo random codes.

However, when the signals start to come out of synchronization, the signals quickly loose cohesion and their correlation value. FIG. 6b shows an example in which the pseudo random codes are just beginning to become un-synchronized, while FIG. 6c shows an example in which the pseudo random codes are completely out of synchronization. The resultant noise is for all practical purposes indistinguishable from the noise generated by mixing two signals that are modulated using different codes. In prior applications using pseudo random coding, all efforts were therefore directed to keeping the signals in synchronization. However, when properly controlled, this de-synchronization has previously unrealized benefits. By carefully modulating the involved signals using pseudo random coding, it is possible to use a "frequency domain" approach to create an imaging window that allows an imaging device to only image objects within the imaging window, while compensating for (or ignoring) murky air or other objects.

Figure 7A:
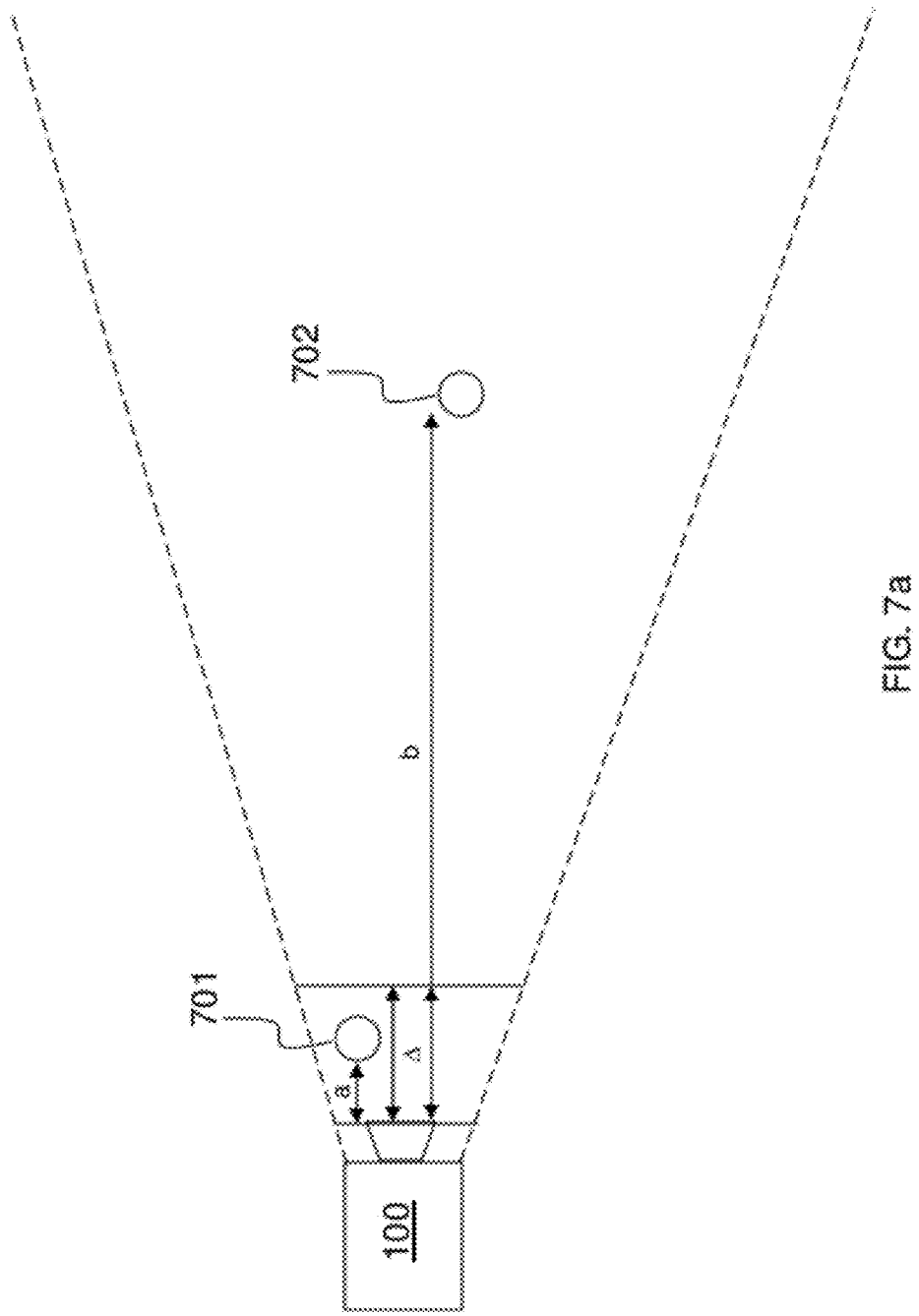
FIG. 7a depicts an exemplary embodiment of an imaging window created using an imaging device according to an exemplary embodiment of the invention when no delay is added to the modulation of the image sensor.

For example, when a pseudo random code is applied to a modulated illumination signal that is emitted from a range imaging camera and to the image sensor of the same range imaging camera, the range imaging camera will be able to decode reflected images, as long as the sequences are synchronous. However, when the two pseudo random sequences lose synchronization, the signal cannot be decoded. Accordingly, signals reflected off of nearby objects remain in synchronization because the signals travel only a short distance and are returned almost instantly—and thus remain synchronous. In contrast, signals reflected off of objects that are located farther away from the imaging device take longer to return to the range imaging camera and thus become steadily more out of synchronization. Consequently, objects beyond a particular range will not be imaged. In effect, the imaging window provides a space outside of which signals and objects are ignored. An example of this is shown in FIG. 7a. As shown in FIG. 7a, light emitted from an exemplary range imaging device 100 is reflected back to the device 100 off of objects 701 and 702. If the maximum distance the emitted signal can travel before becoming out of synchronization with the image sensor's modulation is 2Δ, then the front edge of the imaging window will be at the surface of the device 100, while the back edge of the imaging window will be at a distance Δ from the device. Accordingly, the signals reflected off of objects within a distance Δ from the device 100 will be properly imaged, while objects further away will be effectively ignored. As shown in FIG. 7a, the first object 701, at a distance α, will be imaged while the second object 702, at a distance β, will not.

It should be recognized that the reflected signals that are not synchronized do not need to be actually "ignored" by the imaging device. Instead, after image integration, these signals can be interpreted as a DC signal. The DC signal can contribute to the signal offset and noise levels, which can be compensated for using image sensors having very good "DC offset rejection."

The above example may be helpful in ignoring more distant objects, but is somewhat limited in that it is only able to image objects within a certain distance from the range imaging device, because when the modulated illumination signal (the emitted signal) and the image sensor are modulated using synchronous pseudo random codes, the front edge of the imaging window will be proximate the image sensor. This may be sufficient in some situations, such as when using an imaging system in conjunction with a gaming system where a user, who is located in front of the device, may attempt to use a gesture recognition system to control a game, or where a user attempts to use a gesture recognition system to control a television. However, it may often be the case that the user is not the only person or object in the room. For example, there may be other people in the room or there may be objects in the scene, including in the background. This is not always ideal. When the object to be imaged is somewhat distant from the ranging device, it is beneficial to set the front edge of the imaging window closer to the object and farther from the sensor in order to minimize the effects of fog or smoke. Similarly, undesired objects are often located closer to or farther from the ranging device than the objects to be imaged.

If, for example, in FIG. 7a it was desirable to image the second object 702 instead of the first object 701, the range imaging camera 100 would have to be moved closer to the second object 702. This is not always practical. Similar difficulties can also occur in situations where range imaging cameras are hidden behind darkened security glass, because the reflections from the inside of the glass can introduce errors in a manner similar to fog.

In one exemplary embodiment, a delay is added to the modulation of the image sensor to move the imaging window away from the imaging device. By altering the delay, the position of the imaging window can be adjusted to a particular distance away from the device, where it will effectively ignore light reflected by objects outside of the imaging window, while also mitigating the effects of fog or other objects, between the range imaging camera and the object of interest. This may be useful in various applications. For example, in a gaming application where a user generally stands four to six feet in front of the range imaging camera, the range imaging camera may be set to ignore any objects closer to or farther from the range imaging camera. Similarly, in an application where security glass is placed six inches in front of a range imaging camera, the range imaging camera may be calibrated to ignore signals reflected from objects within one foot of the range imaging camera. As another example, when a range imaging camera is used in a vehicle protection system, the range imaging camera may be set to only recognize objects that are five to 500 feet away from the range imaging camera in order to eliminate light reflected from rain or fog that is close to the range imaging camera and light that is reflected from other cars that are outside of a zone of concern.

Figure 1:
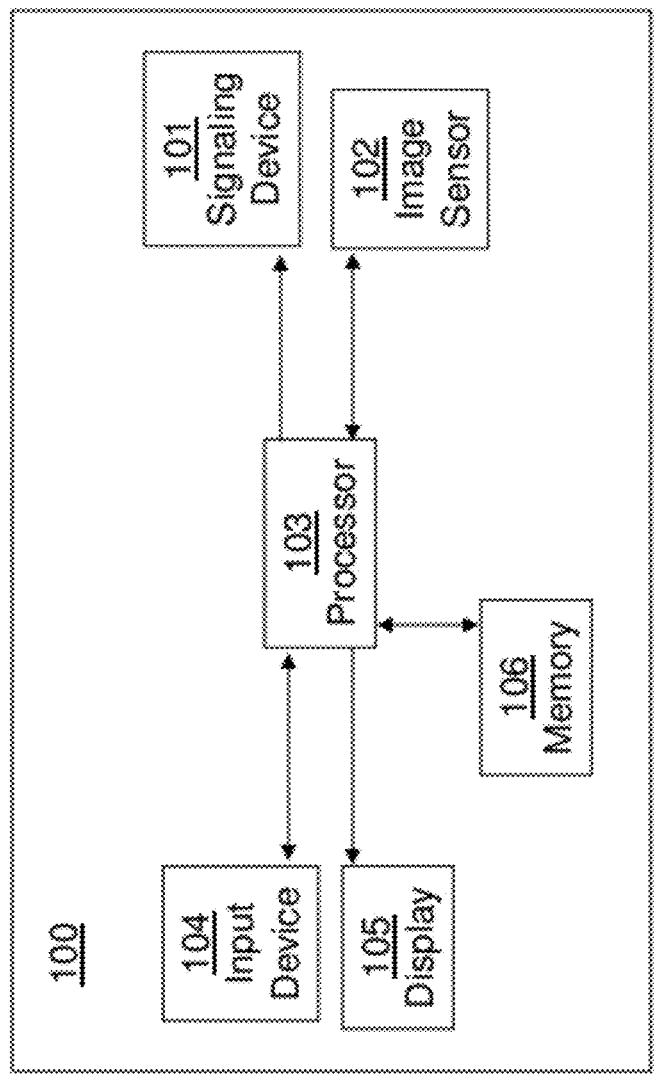
FIG. 1 depicts a schematic diagram of a standard imaging device.
Figure 2:
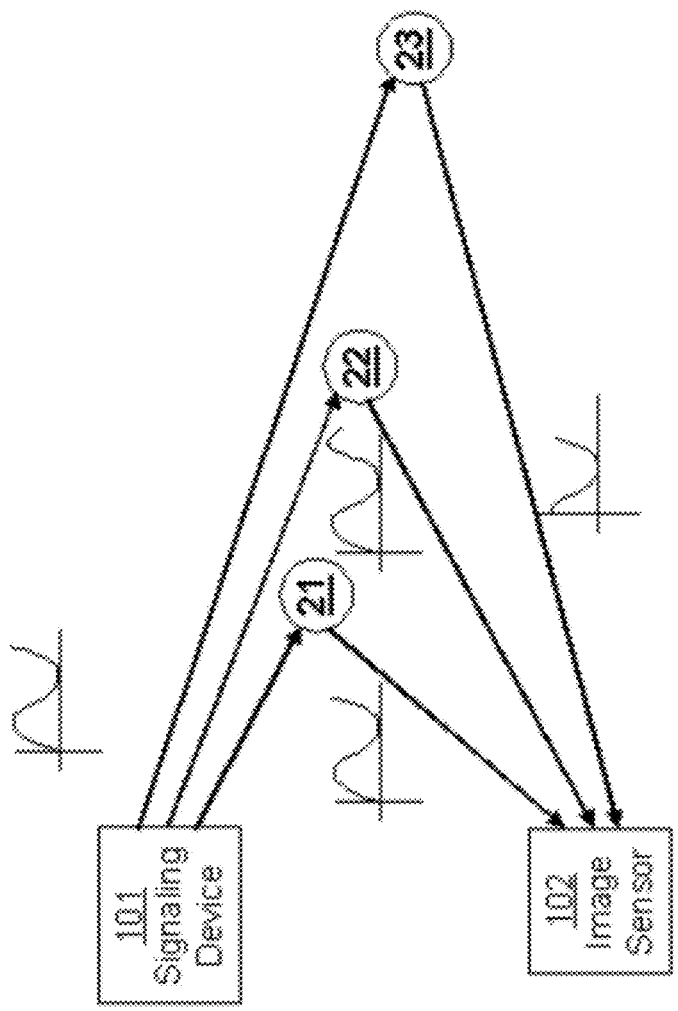
FIG. 2 depicts a functional diagram of a standard imaging device.
Figure 3:
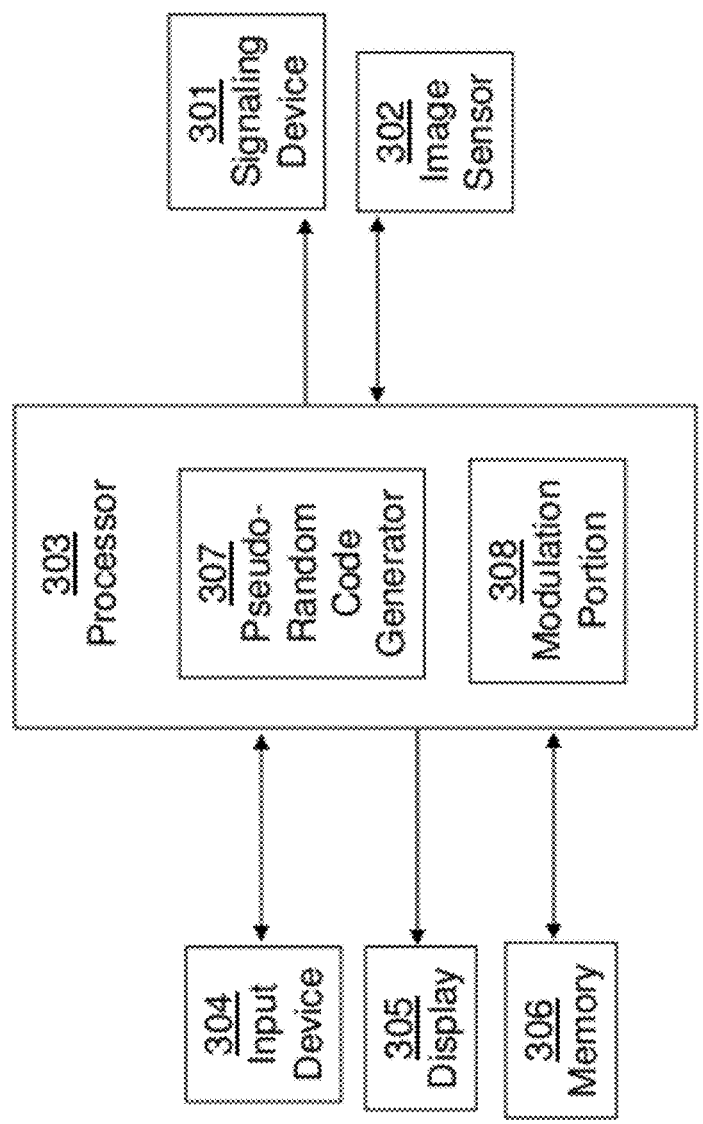
FIG. 3 depicts a schematic diagram of an imaging device according to an exemplary embodiment of the invention.
Figure 4:
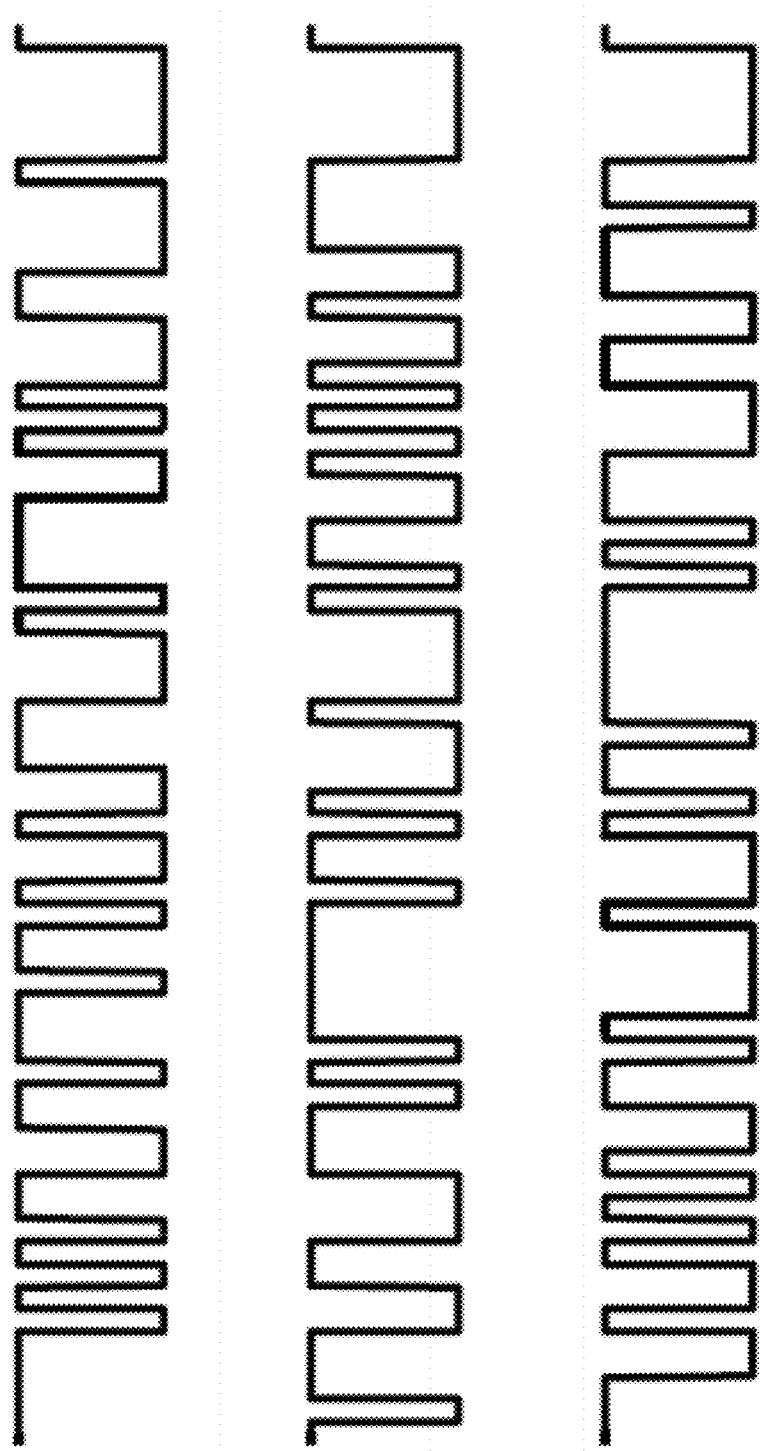
FIG. 4 depicts examples of pseudo random codes.

FIG. 3 shows an example of an imaging system 300 in which a processor 303 includes a pseudo random code generator 307 to generate a code. The processor 303 may also include a modulation portion 308 to modulate the modulated illumination signal generated by the signaling device 301, and to modulate the image sensor 302. The system 300 may also introduce a delay into the modulation of the image sensor in order to move the imaging window away from the image sensor 301.

While FIG. 3 depicts a simplified system, it is understood that many different combinations of hardware and software may be used to form a range imaging system. For example, the signaling device 301 and/or the image sensor 302 may be external to the system. Furthermore, the pseudo random code generator 307 and/or modulation portion 308 may be external to the processor 307; they may also be the same device.

Figure 7B:
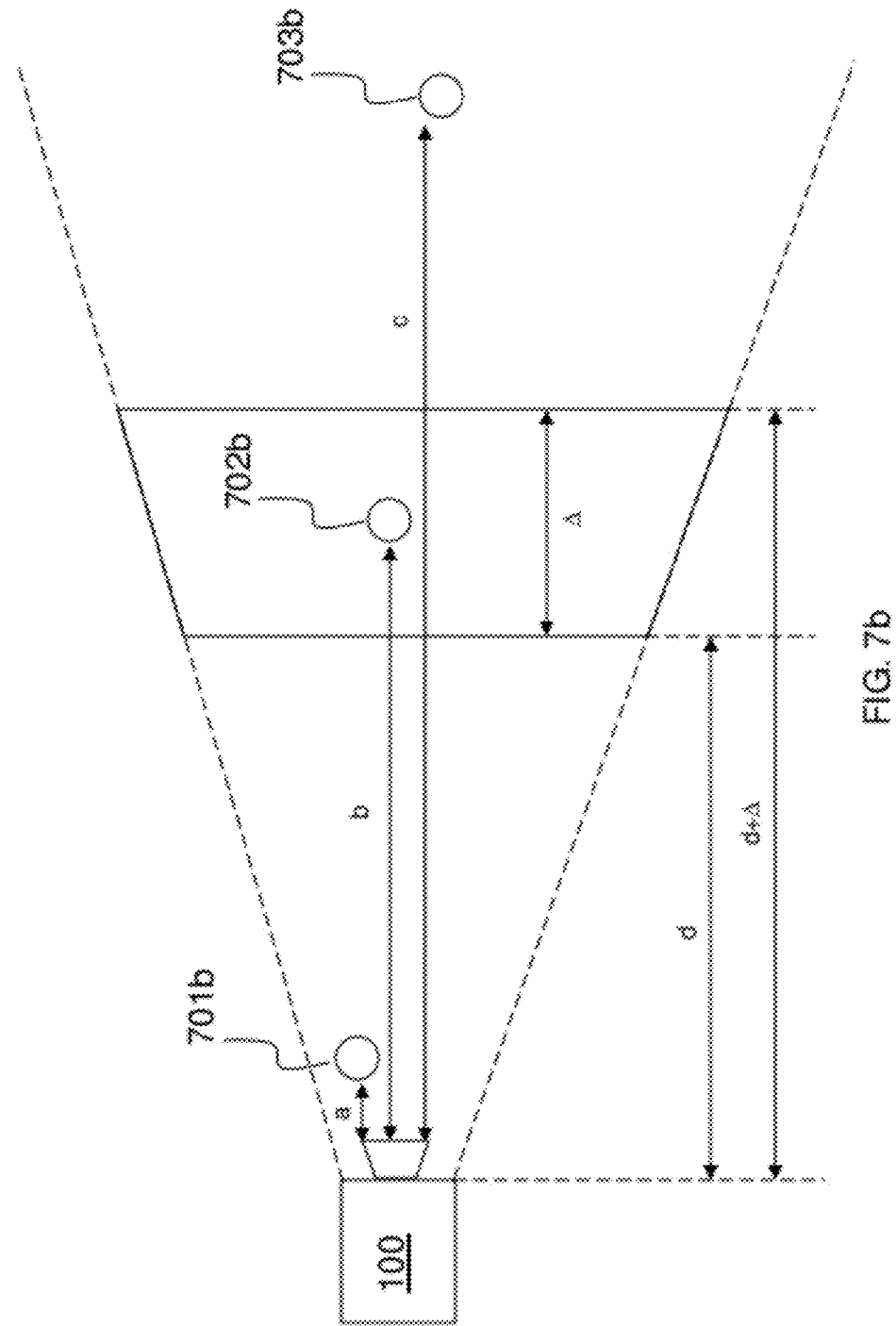
FIG. 7b depicts an exemplary embodiment of an imaging window created using an imaging device according to an exemplary embodiment of the invention when a delay is added to the modulation of the image sensor.

FIG. 7b depicts a scene similar to that of FIG. 7a, but in which a user wishes to image a second object 702b, while ignoring a first object 702a and a third object 703b. Again, the effective depth of the imaging window is a distance Δ. That is, from a point at which a modulated signal is in sufficient synchronization with the image sensor, it may travel a distance of 2Δ until it loses synchronization. The distance the signal travels prior to becoming synchronized may be adjusted by adjusting the delay. As shown in FIG. 7b, the depth of the imaging window therefore remains Δ. However, the edge of the imaging window nearest the device 100 is at a distance d from the device 100, while the far edge is at a distance d+Δ, wherein the distance d may be determined by adjusting the delay applied to the modulation of the image sensor.

As noted above, the depth of the imaging window Δ is a result of the reflected signal and the decoding signal slipping into and out of synchronisation. Each pseudo random sequence has a particular correlation function. When the reflected signal and the decoding signal are perfectly aligned, there will be a correlation measurement of one. However, as they start to get misaligned, the correlation drops off to zero. This results in an imaging window having a triangular correlation function, as shown by way of example in FIG. 8a. The peak of the triangle occurs where the signals are perfectly aligned, while the correlation drops off as the signals are coming into or going out of alignment. While this drop off may be substantially linear, as shown in the example, the drop off may be non-linear depending on the codes that are used and the response, bandwidth, or transfer function of the illumination and sensor modulation. Because the imaging window is a by-product of reflected light becoming increasingly out of synchronization with the modulation of the imaging sensor, the imaging window may not be a clearly defined window. Instead, in some embodiments, the window will have a very well defined center and roughly defined edges where the synchronization fades to randomness. This results in most of the information gathered from the center of the window, with the amount of information gathered tapering off towards the front and rear edges of the window. Additionally, although the shape of the imaging window is shown as a triangle in FIG. 8a, this triangle represents the quantity of data reflected to the device by objects at a corresponding distance. The triangular shape does not represent the physical shape of the imaging window.

While the imaging window is shown to have a triangular shape, it is understood that such a shape is not necessary. In various embodiments of the invention, the imaging window may have many different shapes, including, but not limited to, a substantially triangular shape, a cosine cycle shape, a rounded shape, or a sinusoidal shape. Image windows having substantially triangular shapes may diverge from triangular shapes in one or more aspects including, but not limited to, having rounded or poorly defined corners or having poorly defined edges.

Figure 8B:
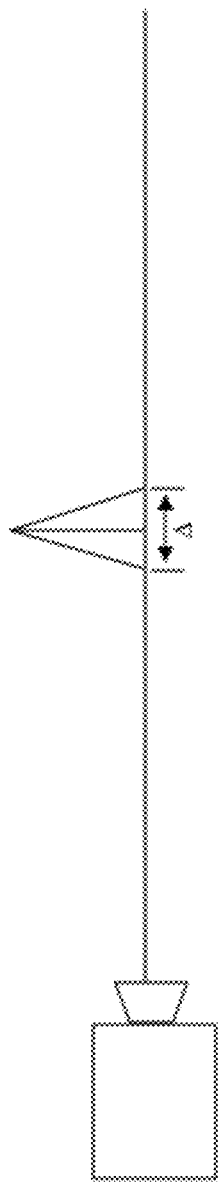
FIG. 8b depicts a triangular nature of an imaging window created according to an exemplary embodiment of the invention, wherein a depth of the image window is shortened by increasing the modulation frequency.
Figure 8C:
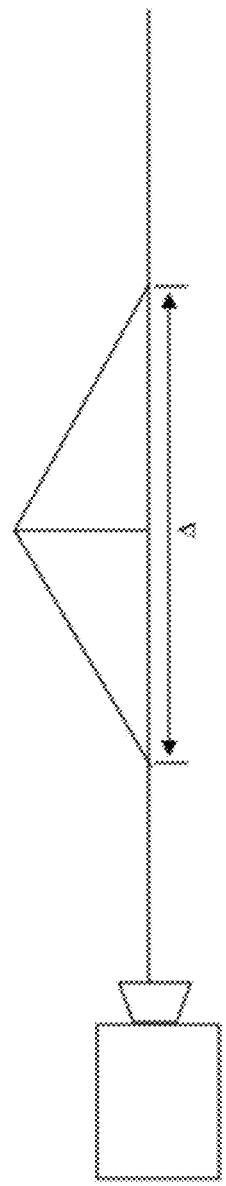
FIG. 8c depicts a triangular nature of an imaging window created according to an exemplary embodiment of the invention, wherein a depth of the image window is lengthened by decreasing the modulation frequency.

It is sometimes desirable to change the depth Δ of the window. For example, when the object to be imaged is "narrow" and the air is particularly foggy, it may be strongly preferred that the depth of the imaging window be as narrow as possible to avoid the negative effects of the fog or of an object behind the object to be imaged. The depth Δ of the imaging window may be adjusted in different ways. For example, different pseudo random codes will have different correlation functions in which the correlation drops off at different rates. Additionally, the depth Δ of the imaging window will be inversely proportional to the pseudo random clocking frequency. Consequently, the depth Δ may also be altered by adjusting the pseudo random or the clock rate. Examples of such adjustments are shown in FIGS. 8b and 8c, in which the depth Δ is reduced and increased, respectively.

Additionally, two copies of a pseudo random code, or two or more different codes could be effectively added together within the integration period using different delays or modulation frequencies to widen the depth of the imaging window. Multiple codes may be used to replace the singular triangular imaging window with two overlapping or separate image windows. Furthermore, the depth of the imaging window may be increased by using pseudo random codes with less well defined correlations such that they take longer to slip into or out of correlation. Selecting such poorly correlated codes is contrary to the known use of pseudo random coding in the cellular field where every effort is made to use codes having a well defined correlation in order to accurately reject other pseudo random codes.

According to one exemplary embodiment of the invention, it is possible to narrow the depth such that the correlation drops from 1 to 0 over the course of a single clock cycle—that is, Δ/2=one clock cycle. The pseudo random codes and the frequencies used may be selected to generate imaging windows having shapes that are more similar to rectangles than triangles. By using rectangular imaging windows, similar quantities of data can be gathered over the entire depth of the windows. This may result in more accurate intensity determinations.

Additionally, existing range determination methods can be utilized by mixing the pseudo random sequence with a continuous modulation signal. One method that may be used to perform this mixing operation includes binary phase encoding a continuous modulation signal with the pseudo random sequence. This operation is achieved by phase shifting the continuous modulation signal by π radians multiplied by the pseudo random code. A preferred method of achieving this mixing is to apply a digital Exclusive Or—otherwise known as an 'XOR' function—to the continuous modulation and pseudo random signals.

Object range may then be determined by collecting multiple samples of the received signal, where a phase offset is added to the continuous modulation signal while the phase or offset of the pseudo random sequence is held constant. In such an embodiment, the object range is encoded as the phase of the continuous modulation signal, while the pseudo random code applies a weighting to the amplitude of the recovered continuous modulation signal. This weighting corresponds to the selected distance imaging window, where objects inside the window have an appreciable amplitude value, while the amplitude of objects outside the window is substantially zero. The phase of the continuous modulation signal may then be calculated from the multiple samples to provide the range to the object.

In one exemplary embodiment, a range imaging cameras may be used as a component in video conference systems in which it is desirable to image only the conference participants. By imaging only the participants, additional background data may be added to the image to make it appear as if the participants are in a different location than they actually are, such as a large conference room or at a job site. Also, a user may be imaged in order to form an avatar that may be used in a video game or other computer generated environment.

In another exemplary embodiment, a processor is used for identifying and tracking the movements of a person or object being imaged. This processor may be the same processor discussed above, or it may be an additional processor.

Furthermore, the position and the depth of the imaging window may be adjusted substantially in real time. This will ensure that a person being imaged will not inadvertently move partially or wholly outside of the imaging window and consequently "disappear" from a transmitted image.

Multiple image ranging systems may use multiple signal emitters and image sensors that are modulated using different pseudo random codes. These systems allow different objects to be imaged by different range imaging cameras at the same time within the same scene.

The detailed description has described various embodiments with respect to the processing of a single pixel in a full-field system, but could also be applied in other applications, such as to a single point sample from a point scanning system, for example. In addition, the algorithms described herein could be implemented by either hardware or software. Also, the processor described herein could be a general purpose computer/PC, microcontroller, ASIC or any other equivalent implementation.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, the use of pseudo random codes discussed below is not restricted to the use of a specific code; other pseudo random sequences may be used. Additionally, other types of spread spectrum codes, including but not limited to, maximum length sequences (mcodes), gold codes, Walsh-Hadamard sequences, quaternary sequences, and Kasami codes may be used.

AMCW range imaging cameras having a fixed clock cycle (i.e., a fixed frequency of the square waveforms emitted by the drivers) may encounter difficulties in ranging objects where the distance between the range imaging camera and the objects is such that the reflected light is more than 360° out of phase with the emitted light. This is because the phase shift cannot actually be more than 360°. Due to the nature of phase shifting, a phase shift of 360° is identical to a phase shift of 720° and to a phase shift of 0°. Likewise, a phase shift of 270° is identical to a phase shift of 630°. This can create difficulties for typical range imaging cameras because the phase shift of two objects may be identical, and therefore determined to be at the same distance from the camera, when the objects are actually quite far apart. By implementing a range imaging window that encompasses only objects in a desired range, devices according to the current invention can effectively avoid the above problems.

Additionally, light scattering from one or more objects in the scene on to an object of interest can cause interference as this scattered light has the effect of a secondary illumination source with a larger path-length, known as multi-path. Selective distance imaging can overcome this interference by rejecting the interfering light with a path-length outside the selected depth window.

What is claimed is:

1. A method for determining a distance to an object using an amplitude modulated continuous wave range imaging device, the method comprising:
    emitting, using an illumination device, a modulated illumination signal, wherein the modulated illumination signal is modulated with a pseudo random code;
    modulating an image sensor based on the pseudo random code to capture a plurality of samples of the modulated illumination signal reflected from the object, wherein the image sensor uses an integration process to average the reflected signal for each of the plurality of samples;
    determining an imaging window within which the reflected modulated illumination signals are accepted, wherein the imaging window occurs where the image sensor modulation pseudo random code is correlated with the captured modulated reflected illumination pseudo random code, wherein the image sensor modulation pseudo random code and the captured modulated reflected illumination pseudo random code become uncorrelated outside the imaging window, and wherein the integration of the uncorrelated signals forms a signal equivalent to constant background illumination; and
    determining a phase shift between the plurality of samples and the modulated illumination signal.

2. The method of claim 1 further comprising:
    determining a distance from the amplitude modulated continuous wave range imaging device to the object based upon the phase shift.

3. The method of claim 2 further comprising:
    defining the pseudo random code based on a target back edge for the imaging window.

4. The method of claim 2 further comprising:
identifying the object in the plurality of images; and
in response to detecting that the object is moving away from or towards the amplitude modulated continuous wave range imaging device, performing at least of one the following to move the imaging window:
changing the pseudo random code;
changing a time delay between emitting the pseudo random code in the modulated illumination signal and when the pseudo random code modulates the image sensor; or
changing a frequency of the modulated illumination signal.

5. The method of claim 1 further comprising:
setting a time delay between emitting the pseudo random code in the modulated illumination signal and when the pseudo random code modulates the image sensor.

6. The method of claim 1, wherein the modulated illumination signal is modulated with a pseudo random code mixed with a continuous wave.

7. The method of claim 6 further comprising:
setting a time delay between emitting the pseudo random code in the modulated illumination signal and when the pseudo random code modulates the image sensor.

8. The method of claim 7, wherein the time delay is set based upon a target front edge for an imaging window.

9. The method of claim 7 further comprising:
defining the pseudo random code based on a target back edge for the imaging window.

10. A non-transitory computer-readable medium encoded with a computer program for determining a distance to an object using an amplitude modulated continuous wave range imaging device, the computer program having computer executable instructions for:
causing an illumination device to emit a modulated illumination signal, wherein the modulated illumination signal is modulated with the pseudo random code;
causing an image sensor to be modulated based on the pseudo random code to capture a plurality of samples of the modulated illumination signal reflected from the object, wherein the image sensor uses an integration process to average the reflected signal for each of the plurality of samples;
determining an imaging window within which the reflected modulated illumination signals are accepted, wherein the imaging window occurs where the image sensor modulation pseudo random code is correlated with the captured modulated reflected illumination pseudo random code, wherein the image sensor modulation pseudo random code and the captured modulated reflected illumination pseudo random code become uncorrelated outside the imaging window, and wherein the integration of the uncorrelated signals forms a signal equivalent to constant background illumination; and
determining a phase shift between the plurality of samples and the modulated illumination signal.

11. The computer-readable medium of claim 10, the computer program further comprising instructions for:
determining a distance from the amplitude modulated continuous wave range imaging device to the object based upon the phase shift.

12. The computer-readable medium of claim 11, the computer program further comprising instructions for:
defining the pseudo random code based on a target back edge for the imaging window.

13. The computer-readable medium of claim 11, the computer program further comprising instructions for:
identifying the object in the plurality of images; and
in response to detecting that the object is moving away from or towards the amplitude modulated continuous wave range imaging device, performing at least of one the following to move the imaging window:
changing the pseudo random code;
changing a time delay between emitting the pseudo random code in the modulated illumination signal and when the pseudo random code modulates the image sensor; or
changing a frequency of the modulated illumination signal.

14. The computer-readable medium of claim 10, the computer program further comprising instructions for:
setting a time delay between emitting the pseudo random code in modulated illumination signal and when the pseudo random code modulates the image sensor.

15. The computer-readable medium of claim 10, wherein the modulated illumination signal is modulated with a pseudo random code mixed with a continuous wave.

16. The computer-readable medium of claim 15, the computer program further comprising instructions for:
setting a time delay between emitting the pseudo random code in the modulated illumination signal and when the pseudo random code modulates the image sensor.

17. The computer-readable medium of claim 16, wherein the time delay is set based upon a target front edge for an imaging window.

18. The computer-readable medium of claim 16, the computer program further comprising instructions for:
defining the pseudo random code based on a target back edge for the imaging window.

19. An amplitude modulated continuous wave range imaging device for determining a distance to an object, comprising:
an illumination device configured to emit a modulated illumination signal, wherein the modulated illumination signal is modulated with a pseudo random code;
an image sensor configured to integrate a received signal, wherein the signal is averaged over the integration period to form a plurality of samples of the modulated illumination signal reflected off of the object, wherein the image sensor is configured to be modulated with the pseudo random code;
an imaging window formed by the correlation of the sampling modulation pseudo random code and the received reflected illumination modulation pseudo random code, wherein the sampling modulation pseudo random code and the received reflected illumination modulation pseudo random code become uncorrelated outside the imaging window, and wherein the integration of the uncorrelated signals forms a signal equivalent to constant background illumination; and
a processor configured to determine a phase shift between the modulated illumination signal and the plurality of samples.

20. The device of claim 19, wherein the processor is further configured to define a time delay between when the pseudo random code in the modulated illumination signal is emitted and when the pseudo random code modulates the image sensor.

21. The device of claim 19, wherein the processor is further configured to define the pseudo random code based upon a target back edge of the imaging window.

22. The device of claim 19, wherein the modulated illumination signal is modulated with a pseudo random code mixed with a continuous wave.

23. The device of claim 22, wherein the processor is further configured to set a time delay between when the pseudo random code in the modulated illumination signal is emitted and when the pseudo random code modulates the image sensor.

24. The device of claim 23, wherein the processor is further configured to set the time delay based upon a target front edge of an imaging window.

25. The device of claim 24, wherein the processor is further configured to define the pseudo random code based upon a target back edge of the imaging window.

* * * * *